(12) United States Patent
Corona

(10) Patent No.: US 9,051,969 B2
(45) Date of Patent: Jun. 9, 2015

(54) METHOD OF MOUNTING A SHAFT IN A BEARING CARRIER AND BEARING CARRIER

(71) Applicant: Johnson Electric S.A., Murten (CH)

(72) Inventor: Vincenzo Corona, Asti (IT)

(73) Assignee: JOHNSON ELECTRIC S.A., Murten (CH)

( * ) Notice: Subject to any disclaimer, the term of this patent is extended or adjusted under 35 U.S.C. 154(b) by 41 days.

(21) Appl. No.: 13/722,703

(22) Filed: Dec. 20, 2012

(65) Prior Publication Data

US 2013/0163910 A1    Jun. 27, 2013

(30) Foreign Application Priority Data

Dec. 21, 2011    (IT) .............. TO2011A1181

(51) Int. Cl.
| | |
|---|---|
| F16C 19/20 | (2006.01) |
| F16C 33/60 | (2006.01) |
| F16C 35/06 | (2006.01) |
| F16C 19/54 | (2006.01) |

(52) U.S. Cl.
CPC ......... *F16C 35/061* (2013.01); *Y10T 29/49696* (2015.01); *F16C 19/54* (2013.01)

(58) Field of Classification Search
CPC ........ F16C 19/00; F16C 19/54; F16C 35/061; F16C 35/06; F16C 43/04
USPC ......... 384/490, 493, 504, 512, 520, 537, 551, 384/584, 626
See application file for complete search history.

(56) References Cited

U.S. PATENT DOCUMENTS

| | | | | | |
|---|---|---|---|---|---|
| 3,986,754 | A | * | 10/1976 | Torrant ...................... | 384/504 |
| 5,667,313 | A | * | 9/1997 | Kapaan et al. ............. | 384/544 |
| 2002/0172443 | A1 | * | 11/2002 | Muraki et al. ............. | 384/537 |
| 2007/0076996 | A1 | * | 4/2007 | Lv .............................. | 384/504 |

FOREIGN PATENT DOCUMENTS

JP    64-87916    *    4/1989

* cited by examiner

*Primary Examiner* — James Pilkington
(74) *Attorney, Agent, or Firm* — Muncy, Geissler, Olds & Lowe, P.C.

(57) ABSTRACT

A bearing carrier for a shaft of an electric motor has a carrier member supporting two bearings supporting the shaft. The carrier member has a single bearing seat accommodating the two bearings to ensure the two bearings are coaxially mounted. A spacing member axially separates the two bearings. The spacing member has a central passage through which the shaft extends with radial play, as well as two end surfaces parallel with each other, orthogonal to the axis of the passage and axially separated by a distance which corresponds to the desired mounting distance between the bearings. During assembly, the bearings and spacing member are mounted on the shaft to form a preassembled group. The preassembled group is pressed into the bearing seat of the carrier member, with one bearing being pressed against a stop formed at one end of the bearing seat.

10 Claims, 3 Drawing Sheets

METHOD OF MOUNTING A SHAFT IN A BEARING CARRIER AND BEARING CARRIER

CROSS REFERENCE TO RELATED APPLICATIONS

This non-provisional patent application claims priority under 35 U.S.C. §119(a) from Patent Application No. TO2011A001181 filed in Italy on Dec. 21, 2011.

FIELD OF THE INVENTION

This invention relates to a method of mounting a shaft in a carrier member, and in particular, but not necessarily for mounting the shaft of an electric fan associated with a heat exchanger of a motor vehicle. It also relates to the bearing carrier.

BACKGROUND OF THE INVENTION

More specifically, the invention relates to a mounting method in which two bearing supports are mounted in the carrier member in an axially spaced-apart relationship, and the shaft is mounted in the internal rings of those bearings.

FIG. 1 of the appended drawings illustrates a shaft 1 which is mounted for rotation in a tubular carrier member 2 according to the prior art.

As can be seen in that Figure, there are constructed in the tubular carrier member 2, in an axially spaced-apart relationship, two stop abutments 2a and 2b, against which the external rings 3a and 4a of the bearings 3, 4 thereof, which are introduced from opposite sides into the carrier member 2, abut. The shaft 1 is mounted in the internal rings 3b and 4b of those bearings.

The mounting system illustrated in FIG. 1 has various disadvantages, because it can be affected by errors of parallelism during positioning of the bearings 3 and 4, and errors of coaxiality of those bearings. Also, as each bearing is fitted to its own individual bearing seat, which are formed in respective ends of the carrier member, there is a technical challenge to ensure that the two beating seats are perfectly true and axially aligned. In practice, these two bearing seats will have some error in coaxiality. That is, their axes will be slightly misaligned as they are formed by separate operations.

Therefore, there is a desire for a mounting method in which the disadvantages of the solutions according to the prior art set out above are overcome or at least significantly mitigated.

SUMMARY OF THE INVENTION

Accordingly, in one aspect thereof, the present invention provides a method of mounting a shaft in a carrier member, where the carrier member supports two bearings mounted in an axially spaced relationship, each bearing having an internal ring and an external ring, and the shaft is mounted in internal rings of the bearings, the method comprising the steps of: providing a spacing member with a central passage into which the shaft can be introduced with radial play, and two end surfaces parallel with each other, orthogonal to the axis of the passage and axially separated by a distance which corresponds to the desired mounting distance between the two bearings; introducing the shaft into the passage of the spacing member; mounting the bearings on the shaft, on opposite sides of the spacing member, in such a manner that the respective external rings are brought into abutment against the end surfaces of the spacing member to form a preassembled group comprising the shaft, the spacing member and the bearings, and mounting the preassembled group in the carrier member in such a manner that the external ring of one of the bearings is brought into abutment against a stop formation provided in the carrier member, and securing the spacing member to the carrier member.

Preferably, the method may include forming the spacing member with a substantially cylindrical or slightly frusto-conical outer covering and a transverse wall, and forming the passage in the transverse wall.

Preferably, the spacing member is substantially in the form of a cup with a transverse end wall and the passage is formed in the transverse wall.

Preferably, the method includes the step of forming the spacing member from a sintered material.

Preferably, the method includes the step of forming the carrier with a single bearing seat for mounting the two bearings.

Preferably, the step of mounting the preassembled group in the carrier member includes forming the connection between the bearings and the seat of the carrier member as an interference fit and pressing the bearings into the bearing seat.

Preferably, the step of securing the spacing member to the carrier member comprises pressing the spacer member into the bearing seat as an interference fit.

According to a second aspect, the present invention provides a bearing carrier for mounting a shaft of an electric motor, comprising; a carrier member having an inner chamber; two bearings mounted in an axially spaced relationship within the inner chamber, each bearing having an internal ring and an external ring, the shaft being mounted in the internal rings of the bearings; and a spacing member disposed between the bearings and having two end surfaces in contact with the external rings of the bearings, wherein the spacing member has a central passage through which the shaft extends with radial play, the two end surfaces being parallel with each other, orthogonal to the axis of the passage and axially separated by a distance which corresponds to the desired mounting distance between the two bearings; and the carrier member has a single bearing seat accommodating both bearings and the spacing member, and a stop formation formed at one end of the bearing seat, the external ring of one of the bearings abutting against the stop formation to set the axial location of the bearings within the carrier member.

Preferably, the spacing member has a transverse wall, and the passage is formed in the transverse wall.

Preferably, the spacing member has a substantially cylindrical or slightly frustoconical radially outer surface.

Preferably, the spacing member is substantially in the form of a cup with a bottom forming the transverse wall.

Preferably, the spacing member is of a sintered material.

As the bearing carrier has a single bearing seat accommodating both bearings and the spacing member, the axial alignment of the two bearings must be better than if using two separate bearing seats.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
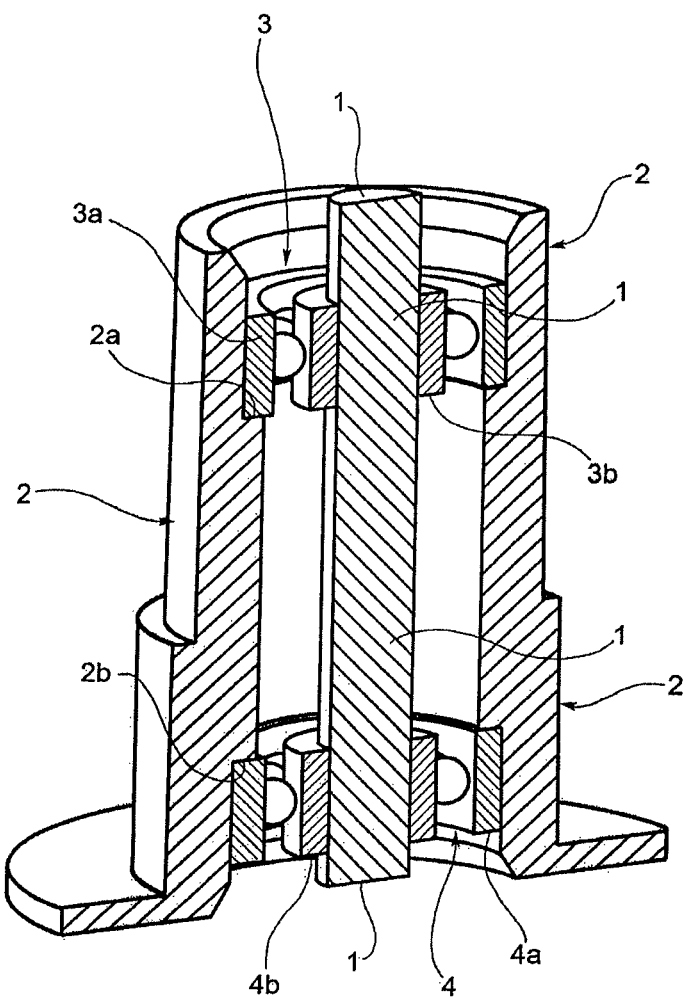
FIG. 1 which has already been described is an axially sectioned, perspective view which shows a shaft mounted in a tubular carrier member by two bearings with a method according to the prior art.
Figure 2:
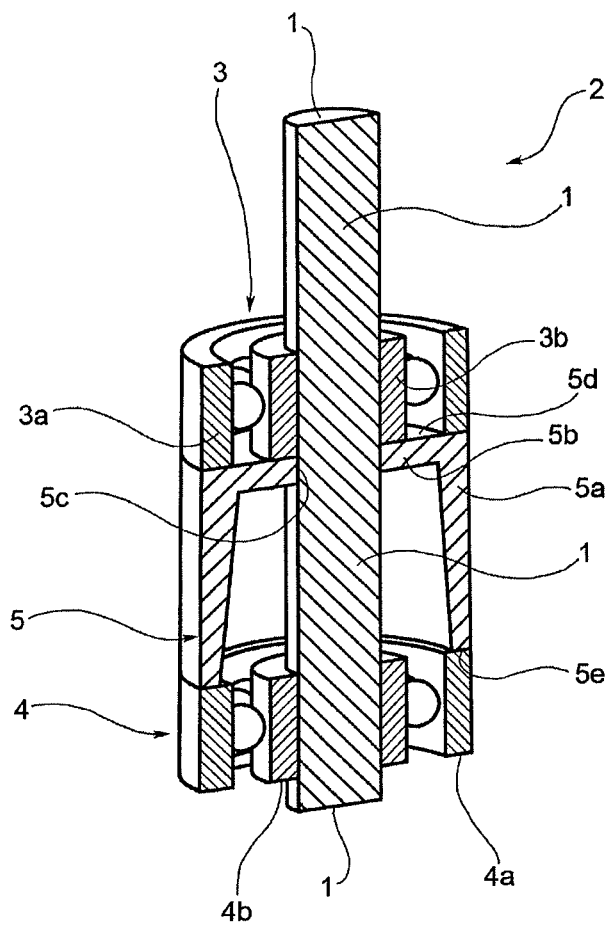
FIG. 2 is an axially sectioned, perspective view which shows a preassembled group according to the preferred embodiment of the present invention, including the shaft, a spacing member and two bearings.
Figure 3:
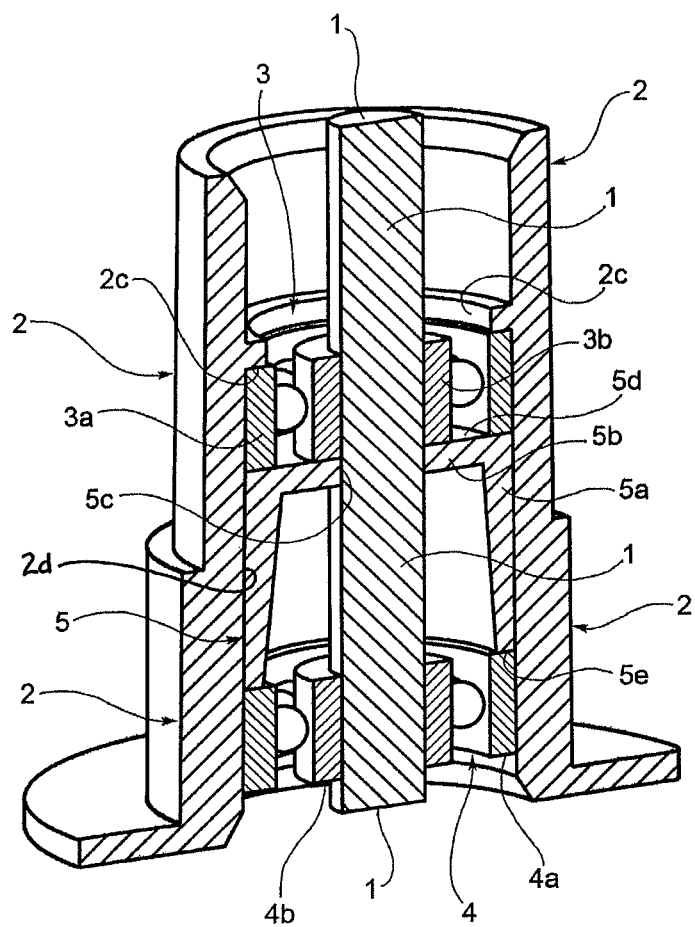
FIG. 3 is an axially sectioned, perspective view which shows a shaft mounted in a tubular carrier member by two bearings, with the method according to the preferred embodiment of the present invention, using the preassembled group shown in FIG. 2.

The mounting method according to the preferred embodiment of the present invention makes provision for a spacing member generally designated 5 in FIGS. 2 and 3.

In the construction of the preferred embodiment, illustrated by way of example, the spacing member 5 has a radially outer surface 5a which is substantially cylindrical (or at most slightly frustoconical) and a transverse end wall 5b in which there is constructed a passage 5c, through which the shaft 1 extends with radial play.

The spacing member 5 which is substantially of inverted cup-like form in the construction illustrated has two mutually parallel end surfaces 5d and 5e which are orthogonal to the axis of the passage 5c.

The end surfaces 5d and 5e of the spacing member 5 are axially separated by a distance corresponding to the desired mounting distance between the bearings 3 and 4 associated with the shaft 1.

With reference to FIG. 2, the shaft 1 is initially introduced into the passage 5c of the spacing member 5. The bearings 3 and 4 are mounted on the shaft 1 from opposite sides with respect to the spacing member 5 in such a manner that the external rings 3a and 4a move into abutment against the end surfaces 5d and 5e of the spacing member, respectively.

A preassembled group shown in FIG. 2, comprising the shaft 1, the spacing member 5 and the two bearings 3 and 4, is then introduced and mounted in the tubular carrier member 2 (FIG. 3) in such a manner that the external ring 3a of the bearing 3 is moved into abutment against a stop formation 2c which is provided in the carrier element 2. As shown, the carrier member has an internal chamber and a surface of the chamber forms a single bearing seat 2d. Both bearings 3, 4 and the spacing member 5 are seated on the bearing seat 2d. The two bearings are preferably an interference fit in the carrier member. A chamfer about the entrance to the bearing seat, provides a lead-in surface for fitting of the preassembled group.

The spacing member 5 is preferably fitted with interference in the tubular carrier member 2. The end surfaces 5d and 5e of the spacing member 5 can be processed with precision so as to ensure almost complete parallelism of the bearings 3 and 4.

The mounting brought about with the method according to the invention therefore allows the disadvantages of the systems according to the prior art mentioned in the introduction of the present description to be overcome. The single bearing seat accommodating both bearings ensures that the two bearings are coaxially mounted.

The transverse end wall 5b assists in the assembly of the preassembled group by loosely supporting the spacing member about the shaft and aligning the sleeve for insertion into the bearing seat 2d, in cooperation with the chamfer. Of course some play is needed between the shaft and the sleeve to allow the shaft to rotate without contacting the sleeve.

Interference fit of spacing member to the carrier member, is a simple and effective way to fix the spacing member to stop movement of the spacer once assembled but also stops the spacing member from being displaced or dislodged during assemble which would otherwise interfere with the proper seating of the bearings.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the bearing carrier is shown as a separate part to be fixed to a support structure such as a housing of the motor. However, it may be formed as an integral part of the support structure or motor housing.

The invention claimed is:

1. A bearing carrier for mounting a rotatable shaft of an electric motor, comprising:
   a stationary carrier member having an inner chamber extending axially;
   two bearings mounted in an axially spaced relationship within the inner chamber, each bearing having an internal ring and an external ring, the shaft being mounted in the internal rings of the bearings; and
   a spacing member disposed between the bearings and having two axial ends, each of the axial ends having an end surface in contact with the external ring of a corresponding bearing,
   wherein the spacing member has a central passage through which the rotatable shaft extends with radial play, the two end surfaces being parallel with each other, orthogonal to the axis of the passage and axially separated by a distance which corresponds to the desired mounting distance between the two bearings,
   wherein the spacing member has a radial outer surface conforming to the inner chamber and a radial inner surface,
   wherein the carrier member has a single bearing seat accommodating both bearings and the spacing member, and a stop formation formed at one end of the bearing seat, the external ring of one of the bearings abutting against the stop formation to set the axial location of the bearings within the carrier member,
   wherein the spacing member has a transverse wall extending radially inwards from one of the two axial ends, and the passage is formed in the transverse wall, and
   wherein the internal ring of said one of the bearings abuts against the transverse wall.

2. The bearing carrier of claim 1, wherein the radial outer surface of the spacing member is substantially cylindrical or frustoconical.

3. The bearing carrier of claim 1, wherein a distance between the outer surface and the inner surface at the axial end of spacing member having the transverse wall is greater than a distance between the outer surface and the inner surface at the other axial end of the spacing member.

4. The bearing carrier of claim 1, wherein the radial inner surface of the spacing member is inclined relative to the radial outer surface of the spacing member.

5. A bearing carrier for mounting a rotatable shaft, comprising:
- a stationary carrier member having an a single bearing seat and a stop formation formed at one end of the bearing seat;
- a spacing member disposed in the bearing seat and having a side wall conforming to the bearing seat, a transverse wall extending radially inwards from an axial end of the side wall, and a passage through which the shaft extends with radial play;
- two bearings disposed in the bearing seat, each bearing having an internal ring and an external ring, the rotatable shaft being mounted in the two internal rings; the two external rings abutting against two axial ends of the side wall the of the spacing member, the external ring of one of the two bearings abutting against the stop formation, and the internal ring of said one of the two bearings abutting against the transverse wall.

6. The bearing carrier of claim 5, wherein the spacing member is substantially in the form of a cup with a bottom forming the transverse wall.

7. The bearing carrier of claim 5, wherein the spacing member is of a sintered material.

8. The bearing carrier of claim 5, wherein the side wall has a radial outer surface extending axially and conforming to the bearing seat and a radial inner surface being inclined relative to the outer surface, with a distance between the outer surface and the inner surface at the axial end of the spacing member having the transverse wall being greater than a distance between the outer surface and the inner surface at the other axial end of the spacing member.

9. The bearing carrier of claim 5, wherein the two bearings are interference fitted in the carrier member.

10. The bearing carrier of claim 5, wherein the spacing member is fitted with interference in the carrier member.

* * * * *